United States Patent [19]

Jonson

[11] 4,140,808
[45] Feb. 20, 1979

[54] LOW-CALORIE PRODUCTS OF THE MAYONNAISE AND DRESSING TYPE, AND A METHOD OF PRODUCING THEM

[75] Inventor: Nils B. Jonson, Östersund, Sweden

[73] Assignee: Nedre Norrlands Producentförening, Östersund, Sweden

[21] Appl. No.: 807,117

[22] Filed: Jun. 16, 1977

[30] Foreign Application Priority Data

Jun. 18, 1976 [SE] Sweden .............................. 7607012

[51] Int. Cl.² .............................................. A23L 1/24
[52] U.S. Cl. .................................... 426/583; 426/585; 426/613; 426/605; 426/589; 426/804
[58] Field of Search ............... 426/583, 585, 605, 613, 426/589, 804

[56] References Cited

U.S. PATENT DOCUMENTS 2,944,906  7/1960  Spitzer et al. ........................ 426/605
3,300,318  1/1967  Szczesniak et al. ................... 426/605

OTHER PUBLICATIONS

Woman's Day Encyclopedia of Cookery, vol. 10, Fawcett Pub. Inc., New York, p. 1588.

*Primary Examiner*—Jeanette M. Hunter
*Attorney, Agent, or Firm*—Finnegan, Henderson, Farabow & Garrett

[57] ABSTRACT

Low-calorie products of the mayonnaise and dressing type are described which products consist of treated sour buttermilk, egg yolk, vegetable oil, acetic acid or vinegar, water, sugar, salt and other spices such as mustard and pepper, a conventional thickeners such as alginic acid and its salts and its 1.2-propylene glycol ester, carboxymethyl cellulose, starch and chemically modified starch, powdered fruit seeds; the fat content of the products being lower than 30%, preferably between 8% and 12%. Also described is a method of producing the low-calorie mayonnaise and dressing type products from treated sour buttermilk. The sour buttermilk is treated by exposure to temperatures and pressures sufficient to remove undesirable aromatic components therefrom.

12 Claims, No Drawings

LOW-CALORIE PRODUCTS OF THE MAYONNAISE AND DRESSING TYPE, AND A METHOD OF PRODUCING THEM

The present invention relates to low-calorie products of the low-fat mayonnaise and/or so-called dressing type, and to a method of producing them.

Mayonnaise is a water-in-oil emulsion intended, in conjunction with food preparation, as a base for sauces, decoration, salads etc. Genuine mayonnaise usually consists of oil, egg yolk, vinegar, mustard and spices. Industrially manufactured products for the consumer also contain acetic acid, sugar, salt, thickener, preservatives and dyes. Suitable thickeners for this type of product consist of:

- alginic acid and its sodium and calcium salts and its 1.2-propylene glycol ester;
- carboxymethyl cellulose and its sodim salt;
- carragenan;
- tragacanth;
- guar gum;
- pectine;
- starch and chemically modified starch, e.g. etherized or esterized.

The approximate rough chemical composition of mayonnaise is apparent from the following table:

| Protein | 1% |
|---|---|
| Fat | 80% |
| Carbohydrates | 2% |
| Energy value | 760 kcal (3170 kJ) |

More recently, so-called light mayonnaise has been introduced onto the market where the term "light" is taken to indicate a fat content of about 30–40%.

The rough chemical composition of light mayonnaise is apparent from the following table:

| Protein | 1.5% |
|---|---|
| Fat | 32% |
| Carbohydrates | 8% |
| Energy value | 340 kcal (1410 kJ) |

The reduction of fat content in light mayonnaise is usually accomplished by reducing the proportion of oil while increasing the proportion of water and thickener.

As is apparent from the above, mayonnaise and light mayonnaise are relatively fatty products. As a result of its versatility in the form of industrially manufactured semi-finished products in combination with modern consumption habits, with a demand for quick availability, the product type can easily contribute to a too great intake of fat. The introduction of light mayonnaise would appear to have taken place against the background set forth above.

The consumption of industrially manufactured mayonnaise and light mayonnaise ought to be the one clearly dominating, since it is rather difficult to produce a good, durable "home-made" product.

The present invention thus relates to a mayonnaise or dressing product with a fat content lower than 30%, preferably 8–12%.

The mayonnaise product according to the invention can have the following composition:

| Ingredient | Range | | Preferably |
|---|---|---|---|
| Buttermilk | 25–70%, | preferably | 45–55% |
| Egg yolk, fresh or a corresponding amount of dry substance from some other form of egg yolk | 5–15%, | preferably | 8–12% |
| Edible oil, e.g. butter oil, peanut butter oil, soya oil etc. | 5–25%, | preferably | 6–10% |
| Acetic acid, 10%, vinegar or other edible acids, e.g. lactic acid, citric acid, phosphoric acid and corresponding combinations of these within the pH range of 3.0–5.0 (determined in the final product) | 3.5–7.5% | preferably | 5.5–6.5% |
| Water (tap water) | 0–25%, | preferably | 12–18% |
| Sugar (saccarose and other carbohydrates with sweetening effect) | 3–15%, | preferably | 4.5–10% |
| Mustard, powdered | 0.2–1.0%, | preferably | 0.4–0.6% |
| White pepper, concentrated, and/or allspice, concentrated, or natural spices in an amount giving the corresponding spice strength | 0–1.0%, | preferably | 0.1–0.4% |
| Thickener consisting of alginic acid and its sodium and calcium salts and its 1.2-propylene glycol ester, carboxymethyl cellulose and its sodium salt, carragenan, tragacanth, guar gum, pectine, starch and chemically modified starch, e.g. etherized or esterized; powdered fruit seeds | 0.5–0.6%, | preferably | 1–2.5% |
| Salt (common salt) | 0–3%, | preferably | 1–2% |

The dressing product according to the invention can have the following composition:

| Ingredient | Range | | Preferably |
|---|---|---|---|
| Buttermilk | 15–50%, | preferably | 25–40% |
| Egg yolk, fresh or a corresponding amount of dry substance from some other form of egg yolk | 4–13%, | preferably | 7–10% |
| Edible oil, e.g. butter oil, peanut butter oil, soya oil etc. | 0–25%, | preferably | 3–7% |
| Acetic acid, 10%, vinegar or other edible acids, e.g. lactic acid, citric acid, phosphoric acid and corresponding combinations of these within the pH range of 3.0–5.0 (determined | | | |

| -continued | | | |
|---|---|---|---|
| in the final product) | 2.5–7.0%, | preferably | 4.5–5.5% |
| Water (tap water) | 20–55%, | preferably | 30–45% |
| Sugar (saccarose and other carbohydrates with sweetening effect) | 4–20%, | preferably | 6–12% |
| Mustard, powdered | 0.15–1.0%, | preferably | 0.3–0.5% |
| White pepper, concentrated, and/or allspice, concentrated, or natural spices in an amount giving the corresponding spice strength | 0–1.0%, | preferably | 0.1–0.4% |
| Thickener consisting of alginic acid and its sodium and calcium salts and its 1.2-propylene glycol ester, carboxmethyl cellulose and its sodium salt, carragenan, tragecanth, guar gum, pectine, starch and chemically modified starch, e.g. etherized or esterized; powdered fruit seeds | 0.1–5.0%, | preferably | 0.3–2% |
| Salt (common salt) | 0–3%, | preferably | 1–2% |

The method according to the invention for producing a mayonnaise product with a fat content lower than 30%, preferably 8–12%, is substantially characterized in that a. sour buttermilk is heat treated in vacuum at a pressure of 0.01–0.7 bar, preferably 0.12–0.3 bar, and at a temperature of +40° C.–+90° C., preferably +50° C.–+70° C., to remove undesirable aromatic components;

b. immediately thereafter homogenizing the heat treated, still warm product at a pressure of 50–300 bar, preferably 100–200 bar, at a temperature of +25° C.–+90° C., preferably +50° C.–+70° C., to finely divide the protein;

c. the homogenized product is quickly cooled to a temperature below +20° C., preferably below +8° C.;

d. the cooled, concentrated, sour buttermilk product is transferred to a mixing vessel provided with quick-operating piping means suitable for mixing in powder products which are difficult to disperse. Water, oil, egg yolk, acetic acid, vinegar and premixed powder base consisting of sugar, thickener, mustard, salt and spices are metered into the mixing vessel under agitation.

The mixing process suitably takes place at a temperature below +8° C. The time for mixing is dependent on the piping means and the size of the batch, but the shortest possible mixing time is to be sought after;

e. the ready-mixed product is homogenized at a pressure of 50–300 bar, preferably 100–150 bar, and at a temperature of less than +20° C., preferably at a temperature of +6° C.–+10° C.;

f. the homogenized product is pasteurized, alternatively sterilized by its being heat treated in suitable equipment (a scraping heat exchanger, a pipe heat exchanger, a flat cell heat exchanger, cooking tureens of different kinds, etc.) to a temperature of at least +72° C., preferably +90° C.–+95° C., for a period of at least 30 seconds, preferably 2–5 minutes.

The time and temperature of the sterilized product are so adjusted that remaining microorganisms and enzymes can neither make the product unserviceable for human consumption or otherwise distinguishably alter it during storage of at least one year at a temperature of up to +20° C.

g. After heat treatment the product can be:

I poured warm into a packaging means and then be cooled in the packaging means;

II cooled and then tapped cold (preferably aseptically);

III possibly homogenized before cooling and packing, alternatively before packing and cooling.

Heat treatment of sour buttermilk in vacuum is preferably carried out at a temperature of +50° C.–+70° C. and at a pressure of 0.12–0.3 bar, and means that together with the water there is removed a considerable portion of the aromatic substances in the sour buttermilk which are unpleasant to certain people. Examinations using gas chromatography with regard to the alterations taking place in the composition of the buttermilk before and after treatment according to the above show that a number of aromatic substances have been removed. No more precise characterization of these substances has been able to be carried out, but the absence of unpleasant taste in the product obtained shows that the undesirable flavouring or taste substances have been removed to a great extent.

It is important that the homogenization of the concentrated sour and heat treated product takes place immediately after heat treatment has terminated and while the product is still warm, otherwise separation of the protein takes place easily.

The subsequent cooling of the homogenized buttermilk must take place quickly, otherwise there is the risk of formation of larger sugar crystals (lacto-crystals), which negatively affects the properties of the product.

When mixing in the powder base products, it is important that these are well dispersed, primarily to avoid the formation of lumps of thickener additives and thereby obtaining operational disturbances in subsequent process steps or disturbances in the form of qualitative ununiformity in the final product.

The homogenization of the ready-mixed product takes place to emulgate the amount of fat present and to finely divide added components so that a smooth and homogenous final product is obtained. Stated temperature limits aim at ensuring that hygienic and product process demands are met.

The heat treatment of the homogenized product takes place to ensure that the hygienic and product process demands placed on the final product are met.

During mixing the pH is adjusted within the pH range of 3.5–4.5, preferably pH 4.0–4.3.

Since the nutrient constituents in the buttermilk in the method according to the invention have not been subjected to any notable destruction or conversion, the product produced constitutes an excellent component in different foodstuff compositions, with its content of important nutrients such as adequate protein, easily digested carbohydrates and important vitamins B in combination with low fat content. The manufacturing process of the method according to the invention gives good storage ability and chemical stability to the ready product.

The following example illustrates the composition of a low-calorie mayonnaise-type product produced with the method according to the invention, but is not intended to limit the invention.

| Buttermilk processed as above | 50% |
|---|---|
| Water | 12% |
| Vegetable oil | 9% |
| Egg yolk | 10% |
| Sugar | |
| Acetic acid | |
| Vinegar | |
| Spices | 19% |
| Salt | |
| Thickener | |
| Total | 100% |

This product has a total fat content of about 11%.

What I claim is:

1. In a low calorie food product of the mayonnaise-type having a fat content less than 30% by weight, said product containing egg yolk, edible oil, edible acid, water, sweetener, salt, spices and thickener; the improvement comprising the inclusion of from 25 to 75% by weight treated sour buttermilk, said buttermilk having been treated by subjecting said sour buttermilk to temperatures and pressures sufficient to remove undesirable aromatic components therefrom.

2. The product of claim 1 wherein said product contains from 45 to 55% by weight of said treated sour buttermilk.

3. In a low calorie food product of the dressing type having a fat content less than 30% by weight, said product containing egg yolk, edible oil, edible acid, water, sweetener, salt, spices and thickener; the improvement comprising the inclusion of from 15 to 50% by weight treated sour buttermilk, said buttermilk having been treated by subjecting said sour buttermilk to temperatures and pressures sufficient to remove undesirable aromatic components therefrom.

4. The product of claim 3 wherein said product contains from 25 to 40% by weight of said treated sour buttermilk.

5. The product of claim 1 or 3 wherein said sour buttermilk is treated to remove said undesirable aromatic components by subjecting said sour buttermilk to a pressure in the range of from 0.01 to 0.7 bar. and a temperature in the range of from 40° C. to 90° C.

6. The product of claim 5 wherein the pressure is in the range of from 0.12 to 0.3 bar. and the temperature is in the range of from 50° C. to 70° C.

7. A method of making a low calorie food product of the mayonnaise or dressing type comprising the steps of:
 a. subjecting sour buttermilk to a temperature in the range of from 40° C. to 90° C. at a pressure in the range of from 0.01 to 0.7 bar, to remove undesirable aromatic components therefrom;
 b. forming the treated buttermilk into a finely divided suspension of protein particles;
 c. quickly cooling said suspension to a temperature below 8° C.;
 d. adding the cooled suspension to water, edible oil, egg yolk, edible acid and a premixed powder to form a mixture, while maintaining the temperature of the mixture below 8° C., said powder comprising sweetener, thickener, mustard, salt and spices, said premixed powder being added using means for mixing powders that are difficult to disperse;
 e. homogenizing said mixture to form a homogenized product; and
 f. sterilizing said homogenized product.

8. The process of claim 7 wherein, in step (a), said sour buttermilk is subjected to a temperature in the range of from 50° C. to 70° C. and a pressure in the range of from 0.12 to 0.3 bar.

9. The process of claim 7 wherein said sour buttermilk has a maximum dry substance content of 30% by weight after step (a).

10. The process of claim 7 wherein step (b) is carried out by homogenizing the substance from step (a) at a temperature in the range of from 25° C. to 90° C. and at a pressure in the range of from 50 to 300 bar.

11. The process of claim 7 wherein step (e) is carried out at a pressure in the range of from 50 to 300 bar, and at a temperature below 20° C.

12. The process of claim 7 wherein said sterilizing step exposes said homogenized product from step (e) to a temperature of at least 72° C. for a time in excess of 30 seconds.

* * * * *